(12) United States Patent
Mickelson

(10) Patent No.: US 6,400,503 B1
(45) Date of Patent: Jun. 4, 2002

(54) PORTABLE VARIABLE POWER ZOOM PERISCOPE

(76) Inventor: Philip A. Mickelson, 6074 Wenrich Dr., San Diego, CA (US) 92120

( * ) Notice: Subject to any disclaimer, the term of this patent is extended or adjusted under 35 U.S.C. 154(b) by 0 days.

(21) Appl. No.: 09/876,006

(22) Filed: Jun. 8, 2001

(51) Int. Cl.[7] .............................. G02B 23/08; G02B 5/08
(52) U.S. Cl. ...................... 359/405; 359/402; 359/431; 359/850
(58) Field of Search ................................. 359/362–363, 359/367, 399–409, 421–426, 432, 503–506; D16/130

(56) References Cited

U.S. PATENT DOCUMENTS

| | | | | |
|---|---|---|---|---|
| 1,250,393 A | * | 12/1917 | Vanderlip | 359/402 |
| 1,445,284 A | * | 2/1923 | Bell et al. | 359/403 |
| 3,277,303 A | * | 10/1966 | Jensen et al. | 359/409 |
| 4,707,772 A | * | 11/1987 | Jimenez et al. | 362/110 |
| 5,223,973 A | * | 6/1993 | Ratzlaff | 359/409 |
| 5,595,435 A | * | 1/1997 | Palmer et al. | 362/109 |
| 6,122,100 A | * | 9/2000 | Miller | 359/402 |

FOREIGN PATENT DOCUMENTS

| | | | | |
|---|---|---|---|---|
| FR | 547844 | * | 12/1922 | 359/402 |
| GB | 17355 | * | 12/1915 | 359/402 |
| JP | 8-110477 | * | 4/1996 | 359/399 |

* cited by examiner

Primary Examiner—Thong Nguyen
(74) Attorney, Agent, or Firm—Charles C. Logan, II

(57) ABSTRACT

A portable variable power zoom periscope having an upright oriented main tubular member having a reciprocally mounted slide bar attached thereto. A prism housing is secured to the top end of the slide bar. A flashlight holder is detachably secured to an attachment bracket at the top end of the slide bar and it has a flashlight removably mounted therein. The portable variable power zoom periscope has a focusing lens assembly, a zoom lens assembly and a detachable handle. A belt hook is removably secured to the periscope by the removable handle. The handle may have a radio mounted therein.

17 Claims, 2 Drawing Sheets

FIG. 1

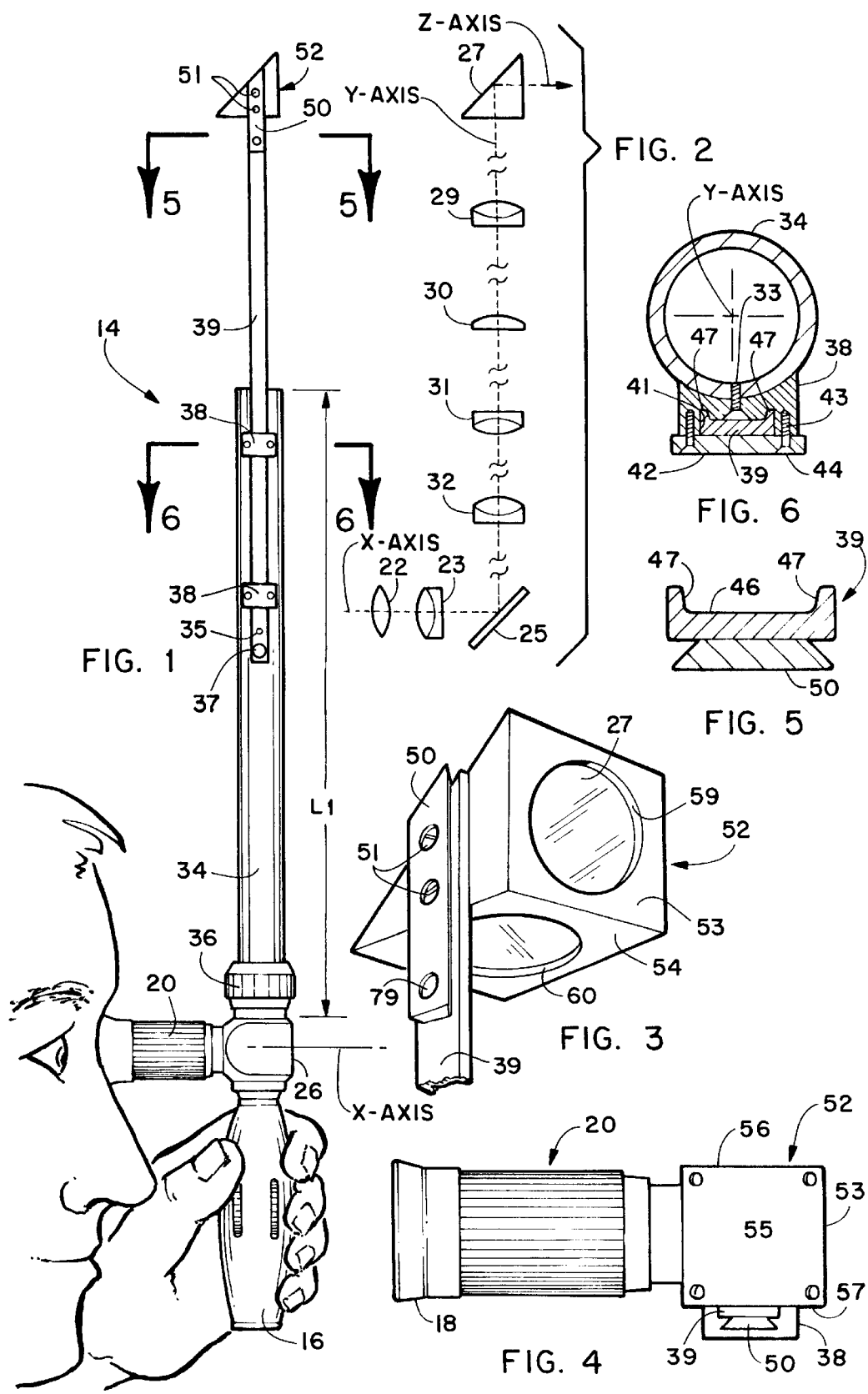

PORTABLE VARIABLE POWER ZOOM PERISCOPE

BACKGROUND OF THE INVENTION

The invention relates to a monocular optical instrument and more particularly to a portable variable power zoom periscope.

There are many occasions when people are standing in a crowd behind several people and trying to see an event that is taking place. People in a crowd, particularly if they are short have a problem trying to see what is happening over the heads of people in front of them. With this periscope, you can see over the crowd. The viewer can clearly observe what is happening and the viewer also has the benefit of adjustable magnification. The 4x to 9x zoom feature makes this instrument especially useful at crowded golf tournaments, from hunting blinds, at horse races, for law enforcement surveillance and swat team operations, for the observation of procedures in operating rooms by doctors and trainees, etc. The zoom feature adds numerous advantages and opportunities for using the portable variable power zoom periscope.

Law enforcement personnel and swat teams have situations during their job that require that they peek around corners when they are searching for individuals. These situations present a danger for the law enforcement officers. Using the portable variable power zoom periscope provides them a better and safer way for viewing an obscured area without placing themselves in danger of being physically attacked or shot. Law enforcement personnel frequently have to search for individuals when it is dark or under conditions of limited light. The officers presently try to manipulate a mirror and flashlight. This unit with a flashlight attached, illuminates the area being viewed and with adjustable magnification, will be safer and provide a much more effective view of the search area.

It is an object of the invention to provide a novel portable periscope having a flashlight detachably secured thereto.

It is also an object of the invention to provide a novel periscope having a zoom lens.

It is another object of the invention to provide a novel portable periscope having a radio mounted in its handle.

It is a further object of the invention to provide a novel portable periscope having a belt hook for attaching to a belt thereby keeping the hands free for other use.

It is an additional object of the invention to provide a novel portable periscope having a prism housing mounted on an adjustable slide bar.

It is also an object of the invention to provide a novel portable periscope having a unique and easily attached flashlight holder bracket.

It is another object of the invention to provide a portable periscope that is economical to manufacture and market.

SUMMARY OF THE INVENTION

The portable variable power zoom periscope has an eyepiece allowing the user to use one eye and look through the monocular tubular member. The prism housing on the top end of the slide bar would be pointed in the direction of the object or the person he wants to view. There is a handle on the bottom end of the periscope that allows the user to conveniently hold it in a position close to his eye. This handle is removable. The ocular tubular member contains a zoom lens that is easily adjusted with the person's other hand. The focusing ring on the eye piece can also be adjusted with that same hand or the other thumb.

The slide bar is reciprocally mounted in a pair of vertically spaced brackets secured to the outer surface of the main tubular member. The slide bar can be easily adjusted to whatever height the individual wishes and a stop pin on the lower end prevents the slide bar from pulling out from the slide bar mounting brackets.

When the portable periscope is to be used in the dark or a low light area, such as an attic, or to see around a corner, by law enforcement personnel, a flashlight holder can be quickly and easily attached to a bracket at the top end of the slide bar. The orientation of the flashlight would direct its light parallel to the axis of the reflective prism mounted in the prism housing.

The removable handle is mounted in the bottom end of the periscope. It has a threaded neck portion whose diameter is slightly less than the opening of the minor loop portion of a removable belt hook so that the neck portion can be inserted into the opening when the handle is attached to the periscope. This allows the belt clip to be easily secured to the bottom end of the periscope so that it can be carried on a person's belt thereby freeing their hands for other purposes. For a recreational type application, there may be a radio mounted in the tubular housing of the handle. It would have an earpiece speaker input jack in its bottom end that would allow the sound to be transmitted to the earpiece speaker of the user. A conventional on/off volume control and tuning control would extend outwardly through the tubular housing.

DESCRIPTION OF THE DRAWINGS

FIG. 1 is a side elevation view illustrating the manner in which the portable variable power zoom periscope is utilized;

FIG. 2 is an exploded schematic side elevation view of the optical system;

FIG. 3 is an enlarged front perspective view of the prism housing;

FIG. 4 is a top plan view of the portable variable power zoom periscope as illustrated in FIG. 1;

FIG. 5 is an enlarged cross sectional view taken along lines 5—5 of FIG. 1;

FIG. 6 is an enlarged cross sectional view taken along lines 6—6 of FIG. 1;

DESCRIPTION OF THE PREFERRED EMBODIMENT

Figure 7:
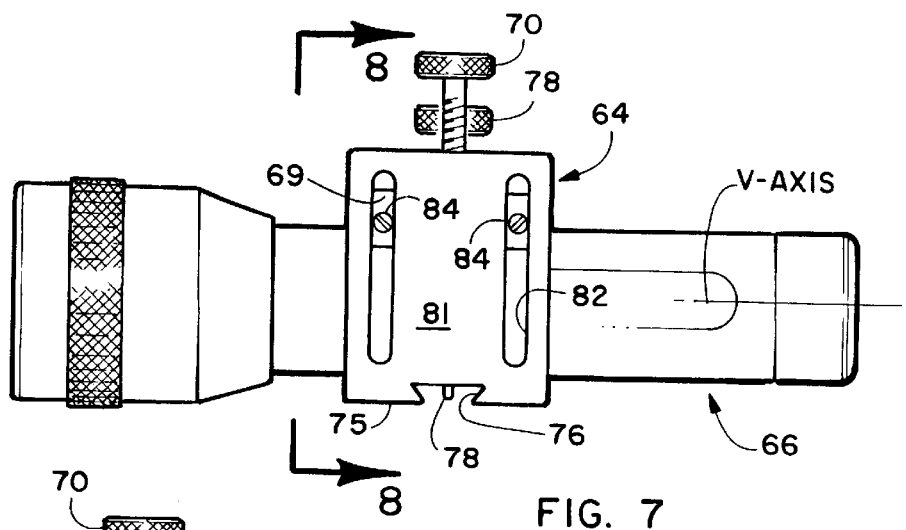
FIG. 7 is a top plan view of the flashlight and flashlight holder bracket.

The portable variable power zoom periscope will now be described by referring to FIGS. 1–10 of the drawings. The periscope is generally designated numeral 14.

FIG. 1 shows the user gripping handle 16 in one hand and positioning the flexible rubber skirt 18 of the ocular tubular member 20 adjacent his eye. An ocular focusing lens assembly capable of focusing at short and long range at 4x to 9x power, is located in ocular tubular member 20. The ocular focusing lens assembly 22, 23 has an X-axis.

FIG. 2 shows that there is a reflector 25 mounted in reflector housing 26 that directs light rays along the vertical Y-axis until it intersects reflecting prism 27 that directs the light rays transversely along a Praxis. A plurality of lenses 29–32 are positioned at predetermined locations within main tubular member 34. Lens 31 and 32 function as a zoom lens assembly. A zoom lens adjustment ring 36 is positioned adjacent the bottom end of main tubular member 34. Main tubular member 34 has a length L1 that is in the range of 8–24 inches.

The slide bar mounting brackets 38 are rigidly secured to the outer surface of main tubular member 34 by screws 33. They each have a recess 41, a cover plate 42, threaded bore holes 43 and fastening screws 44. Slide bar 39 has an elongated main body portion 46 and a pair of laterally extending flanges 47 that mate with the configuration of recess 41. Slide bar 39 freely travels within slide bar mounting brackets 38. A small leaf spring between cover plate 42 and slide bar 39 allows the slide bar to remain at any extended height that the user may wish without slipping downwardly therefrom. A pin 35 limits the vertical extension of slide bar 39. Finger grip knob 37 is used for raising and lowering slide bar 39.

Referring to FIGS. 3–5, a wedge-shaped attachment bracket 50 is shown secured to the top end of slide bar 39 and to one of the sides of prism housing 52 by two fastening screws 51. Prism housing 52 has a front wall 53, a bottom wall 54, a top wall 55, a side wall 56 and a side wall 57. Apertures 59 and 60 reveal reflective prism 27 positioned within prism housing 52. An aperture 79 receives a spring loaded pin 78 whose function will be described later.

Figure 8:
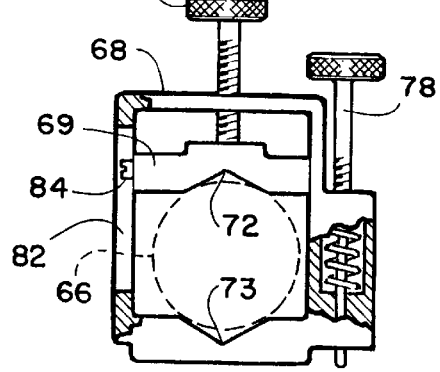
FIG. 8 is a cross sectional view taken along lines 8—8 of FIG. 7.

FIGS. 7–8 illustrate flashlight holder 64 and flashlight 66. Flashlight 66 has a V-axis that would extend parallel to the Z-axis of reflective prism 27. Flashlight holder 64 has a rectangularly shaped tubular frame 68, a pressure plate 69 and an adjustment screw 70. Pressure plate 69 has an alignment recess 72 in its one face that presses against flashlight 66. A second alignment recess 73 is found on the inner surface of the rectangularly shaped tubular frame 68. Side wall 75 has a wedge-shaped groove 76 that mateably receives wedge-shaped attachment bracket 50 that is secured to slide bar 39. A spring loaded pin 78 is removably inserted into aperture 79 of wedge-shaped attachment bracket 50 to secure it in position. Top wall 81 has a pair of laterally spaced grooves 82 that receive the top end of screws 84 that are secured to pressure plate 69. The grooves 82 function as a track or guide for the heads of screws 84 that are positioned therein.

Figure 9:
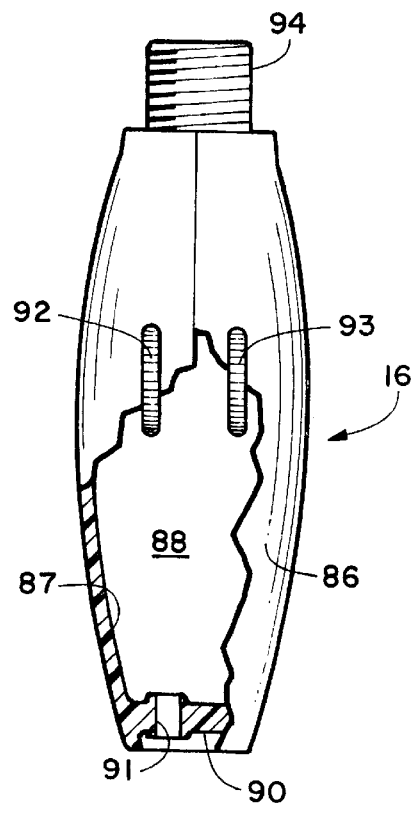
FIG. 9 is a side elevation view of the handle with portions broken away.
Figure 10:
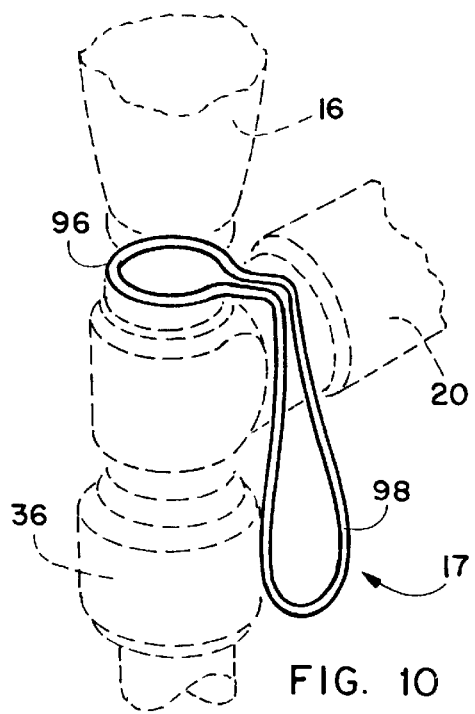
FIG. 10 is a reduced sized front perspective view of the belt hook.

Handle 16 and belt hook 17 will be described by referring to FIGS. 9 and 10. Handle 16 has a tubular housing 86 that forms a chamber 87 therein for housing a battery radio 88. Bottom wall 90 has an earpiece speaker input jack 91. An on/off volume control 92 and a tuning control 93 extend through the wall of tubular housing 86. A threaded neck portion 94 is removably received in the bottom end of reflector housing 26. Belt hook 17 is formed of an integral length of metal rod having a minor loop portion 96 and a major loop portion 98. Belt hook 17 is shown in reduced height but in actuality it would be closer to the height of handle 16. Minor loop portion 96 has an opening slightly larger than the threaded neck portion 94 so that it can be inserted therethrough when the handle 16 is screwed into the bottom end of reflector housing 26. Major loop portion 96 extends downwardly therefrom and can be conveniently looped over a person's belt and periscope 14 can be carried much in the same manner in which a law enforcement officer carries a billy club.

What is claimed is:

1. A portable periscope comprising:

an upright oriented main tubular member having an open top end, an open bottom end, an outer surface, an inner chamber, a longitudinally extending Y-axis and a predetermined length (L1); a plurality of longitudinally spaced lenses are mounted on said Y-axis in said main tubular member;

reflector means positioned adjacent said bottom end of said main tubular member for directing an image transversely to said Y-axis along an X-axis;

an ocular tubular member positioned adjacent said reflector means on said X-axis that functions as an eyepiece for viewing an image passing downwardly through said main tubular member;

a prism housing having a reflective prism mounted therein for transmitting an image transversely to said Y-axis along a taxis; and adjustable support means for reciprocally mounting said prism housing above said top end of said main tubular member for travel along said Y-axis comprising an elongated upright oriented slide bar having a top end and a bottom end; said top end being connected to said prism housing; at least one slide bar mounting bracket is connected to said outer surface of said main tubular housing and it has structure for allowing said slide bar to be reciprocally slid upwardly and downwardly therein.

2. A portable periscope as recited in claim 1 further comprising zoom lens means adjacent said bottom end of said main tubular member for adjusting the magnification of an image passing downwardly through said main tubular member.

3. A portable periscope as recited in claim 1 further comprising means in said ocular tubular member for focusing an image passing therethrough.

4. A portable periscope as recited in claim 1 wherein said reflector means is mounted in a reflector housing having a top end, a bottom end and upright side walls.

5. A portable periscope as recited in claim 4 further comprising a handle having a top end, a bottom end, an outer surface and an interior chamber connected to said bottom end of said reflector housing.

6. A portable periscope as recited in claim 5 further comprising a battery powered radio located in said interior chamber of said handle.

7. A portable periscope as recited in claim 6 further comprising a tuning control and an on/off volume control on said outer surface of said handle.

8. A portable periscope as recited in claim 5 wherein said handle has structure making it removably connected to said bottom end of said reflector housing.

9. A portable periscope as recited in claim 5 further comprising a belt hook removably connected to said handle.

10. A portable periscope as recited in claim 6 further comprising an earpiece audio speaker input jack mounted in said bottom end of said handle.

11. A portable periscope as recited in claim 1 wherein (L1) is in the range of 8–24 inches.

12. A portable periscope as recited in claim 1 further comprising means for limiting upward travel of said slide bar.

13. A portable periscope as recited in claim 1 further comprising attachment means on said slide bar for attaching a flashlight holder thereto.

14. A portable periscope as recited in claim 13 wherein said attachment means is located adjacent said prism housing.

15. A portable periscope as recited in claim 13 further comprising a flashlight holder detachably secured to said attachment means.

16. A portable periscope as recited in claim 15 further comprising a flashlight mounted in said flashlight holder.

17. A portable periscope as recited in claim 1 further comprising a flashlight attached to said portable periscope.

* * * * *